UNITED STATES PATENT OFFICE.

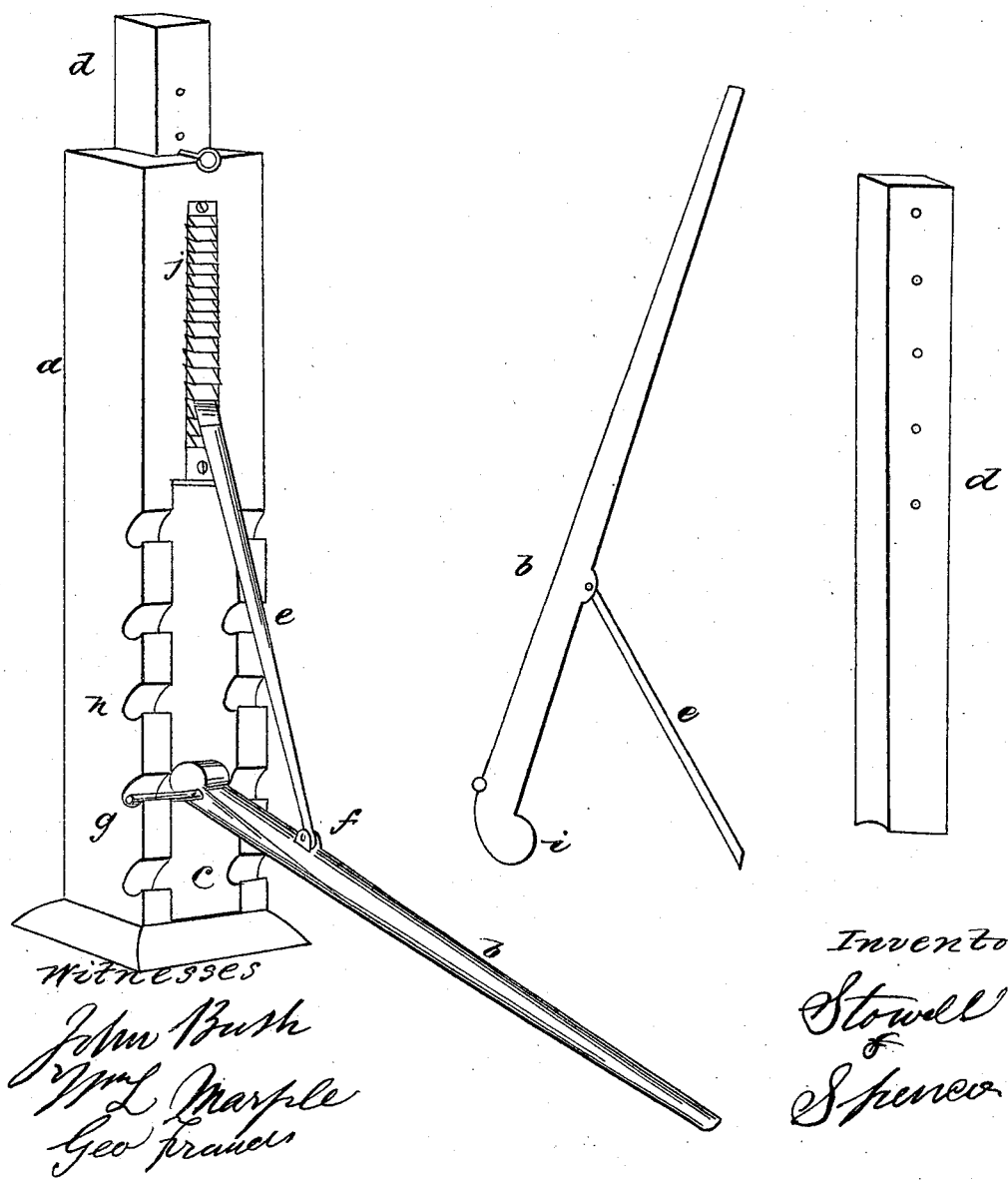

HENRY STOWELL AND LORENZO SPENCER, OF PLACERVILLE, CALIFORNIA.

PORTABLE WAGON-JACK.

Specification of Letters Patent No. 24,160, dated May 24, 1859.

*To all whom it may concern:*

Be it known that we, HENRY STOWELL and LORENZO SPENCER, both of the city of Placerville, in the county of Eldorado and State of California, have invented a new and useful Improvement in the following named machine—to wit., a Portable Wagon-Jack; and we do hereby declare that the following is a full and exact description thereof, and as more fully shown by the annexed drawing specifically referred to, to wit:

$a$ is a lever-chest in which is worked the lever $b$ at the opening $c$.

$d$ is a piston worked in the lever chest by the lever.

$e$ is a hand or clapper-dog working on a hinge or pin on the lever at $f$.

$g$ is a fulcrum-pin which may be made fast to or detached from the lever, and upon which the lever works, the fulcrum-pin resting upon notched rests on the lever-chest at $h$.

Upon the end of the lever which is inserted into the chest is a knuckle $i$. At $j$ on the chest are notches or rag-teeth into which the clapper-dog catches to secure and hold down the lever when depressed and secure in position the weight to be raised.

To enable others skilled in the art and manufacture to make and use our said invention, in addition to the above description we describe its construction and operation— to wit; any part thereof may be constructed of wood iron or any durable and substantial materials, and so proportioned as to adapt it to the purposes to which it may be designed.

Operation: The lever chest is placed with the piston inserted in a vertical position, so as to bring the upper end of the piston directly under the wagon axle or other weight to be raised, the lever is inserted into the chest at the opening $c$ so as to bring the knuckle $i$ a little forward and under the the end of the piston, the fulcrum pin resting upon one of the pair of notched rests $h$. The outer end or handle of the lever is then to be depressed by which means the knuckle turning under the piston forces it up and with it the weight to be raised, the clapper-dog catching into the rag-teeth which holds down the handle of the lever, and secures the weight in position.

If the weight is not sufficiently raised by the first operation the piston is secured by inserting a pin through it in an apperture in the same the pin resting on the top end of the chest, and the operation is repeated after placing the fulcrum-pin on a higher rest, and depressing the lever and securing as before.

What we claim as our invention and desire to secure by Letters Patent is—

The peculiar arrangement, combination and adaptation, for the purpose of raising the axles of wagons and other heavy bodies to which the foregoing invention may be adapted.

HENRY STOWELL.
    LORENZO SPENCER.

Witnesses:
 JOHN BUSH,
 GEO. MCFARR.